(12) United States Patent
Corder et al.

(10) Patent No.: US 6,305,737 B1
(45) Date of Patent: Oct. 23, 2001

(54) AUTOMOTIVE VEHICLE DOOR SYSTEM

(75) Inventors: George A. Corder, Romulus; James E. Tousignant, New Boston; Bernard W. Schaller, Flat Rock, all of MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/630,901

(22) Filed: Aug. 2, 2000

(51) Int. Cl.⁷ .............. B60J 5/00; E05D 15/06; E05D 15/58
(52) U.S. Cl. .............. 296/146.11; 296/146.12; 49/210; 49/211; 49/254
(58) Field of Search .............. 296/146.11, 146.12; 49/209, 210, 211, 216, 218, 219, 220, 254, 257, 258, 259, 367

(56) References Cited

U.S. PATENT DOCUMENTS

| | | | |
|---|---|---|---|
| 3,158,395 | * 11/1964 | Smith | 296/146.12 |
| 3,272,552 | * 9/1966 | Park | 296/56 |
| 3,757,969 | * 9/1973 | Smith | 296/56 |
| 3,758,990 | 9/1973 | Balanos . | |
| 3,873,149 | * 3/1975 | Churchman | 296/56 |
| 4,143,281 | 3/1979 | Appley . | |
| 4,162,097 | 7/1979 | Scribner . | |
| 4,372,603 | 2/1983 | Stanczak et al. . | |
| 4,650,241 | 3/1987 | Motonami et al. . | |
| 4,655,499 | * 4/1987 | Piper | 296/146.11 |
| 4,719,665 | * 1/1988 | Bell | 296/146.11 |
| 4,773,126 | 9/1988 | Voss . | |
| 5,140,316 | * 8/1992 | DeLand et al. | 296/155 |
| 5,244,247 | 9/1993 | Kuwabara . | |
| 5,316,365 | * 5/1994 | Kuhlman et al. | 49/216 |
| 5,335,958 | * 8/1994 | Christenson et al. | 49/254 |
| 5,347,757 | * 9/1994 | Losito | 49/210 |
| 5,491,875 | 2/1996 | Siladke et al. . | |
| 5,577,793 | 11/1996 | Kobasic . | |
| 5,896,704 | * 4/1999 | Neag et al. | 49/209 |
| 5,921,613 | 7/1999 | Breunig et al. . | |

(List continued on next page.)

OTHER PUBLICATIONS

Exhibit A—Four (4) photographs of a 2000 Ranger XLT (No Date).
Exhibit B—Three (3) photographs of a 2001 Saturn Coupe SC (No Date).
Exhibit C—Four (4) photographs of a Buick LaCrosse at the Detroit Auto Show (Jan. 19, 2000).
Internet web page printout, images.traderonline.com, (May 18, 2000), 1 page, Lincoln Continental 4dr convertible.
Internet web page printout, images.traderonline.com, (May 18, 2000), 1 page, 1964 Lincoln Continental 4 dr convertible.
Internet web page printout, www.4.ncsu.edu/~mabench/50linc.htm, (May 18, 2000), 2 pages, 1950 Lincoln Cosmopolitan.
Internet web page printout, www.autoquarterly.com, (May 18, 2000), 4 pages, 1961 Lincoln Continental Convertible.
Internet web page printout, www.cars–on–line.com, (May 18, 2000), 2 pages, 1966 Lincoln Contential.
Internet web page printout, www.geocities.com, (May 18, 2000), 1 page, 1966 Lincoln Continental.
Internet web page printout, www.highwayone.com, (May 18, 2000), 2 pages, 1967 Ford Thunderbird Landau.
Internet web page printout, www.thoughtron.com, (May 18, 2000), 1 page, 1929/30 Model S–Hupmobile 4dr sedan.

Primary Examiner—Joseph D. Pape
Assistant Examiner—Hilary Gutman
(74) Attorney, Agent, or Firm—Harness, Dickey & Pierce, P.L.C.

(57) ABSTRACT

A vehicle door system including a door being pivotally moved about a first axis and a second axis. In another aspect of the present invention, the system provides a locking device that is slidably engaged to lock the door. Another aspect of the present invention pertains to a pair of adjacent passenger doors that open in opposite directions.

38 Claims, 11 Drawing Sheets

U.S. PATENT DOCUMENTS

| | | | |
|---|---|---|---|
| 6,030,024 | | 2/2000 | Schmidhuber et al. . |
| 6,030,025 | | 2/2000 | Kanerva . |
| 6,052,870 | * | 4/2000 | Hagenlocher et al. .......... 296/146.11 |
| 6,053,561 | * | 4/2000 | Hojnowski et al. ............. 296/146.11 |
| 6,089,640 | * | 7/2000 | Cart .................................. 296/146.11 |
| 6,183,039 | * | 2/2001 | Kohut et al. ..................... 296/146.12 |
| 6,196,617 | * | 3/2001 | Beck ................................ 296/146.11 |
| 6,196,618 | * | 3/2001 | Pietryga et al. ................. 296/146.11 |
| 6,213,535 | * | 4/2001 | Landmeser et al. ............. 296/146.12 |

* cited by examiner

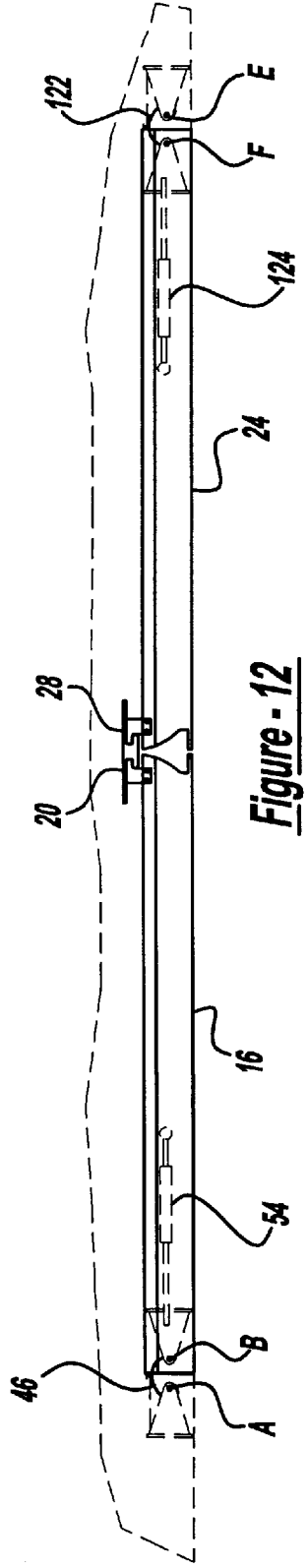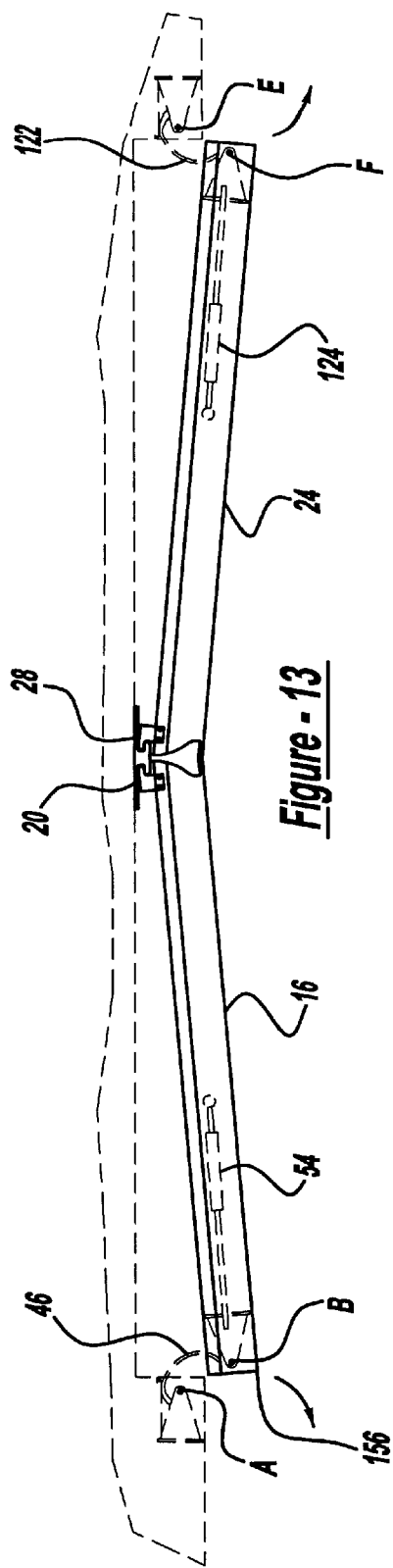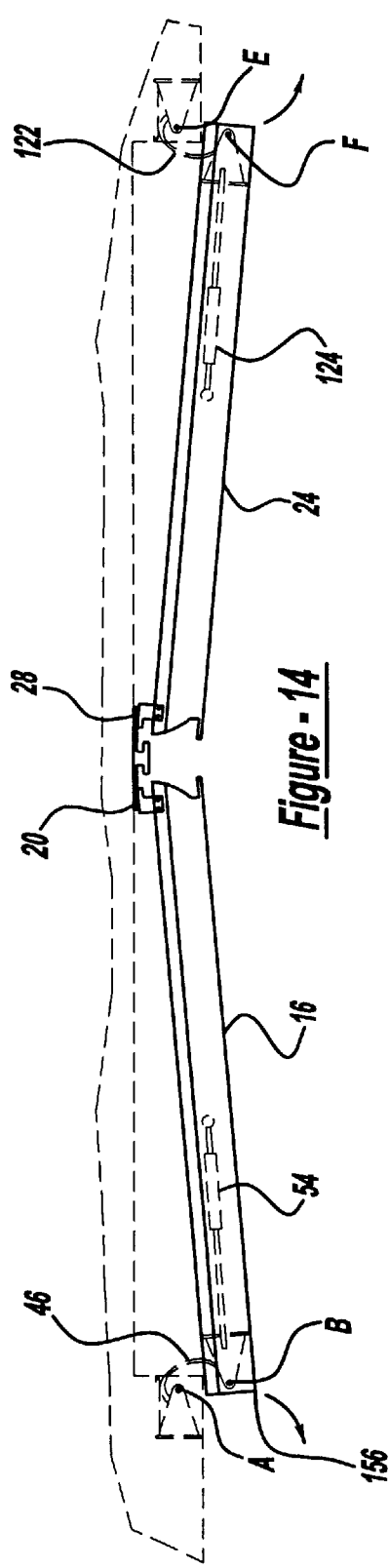

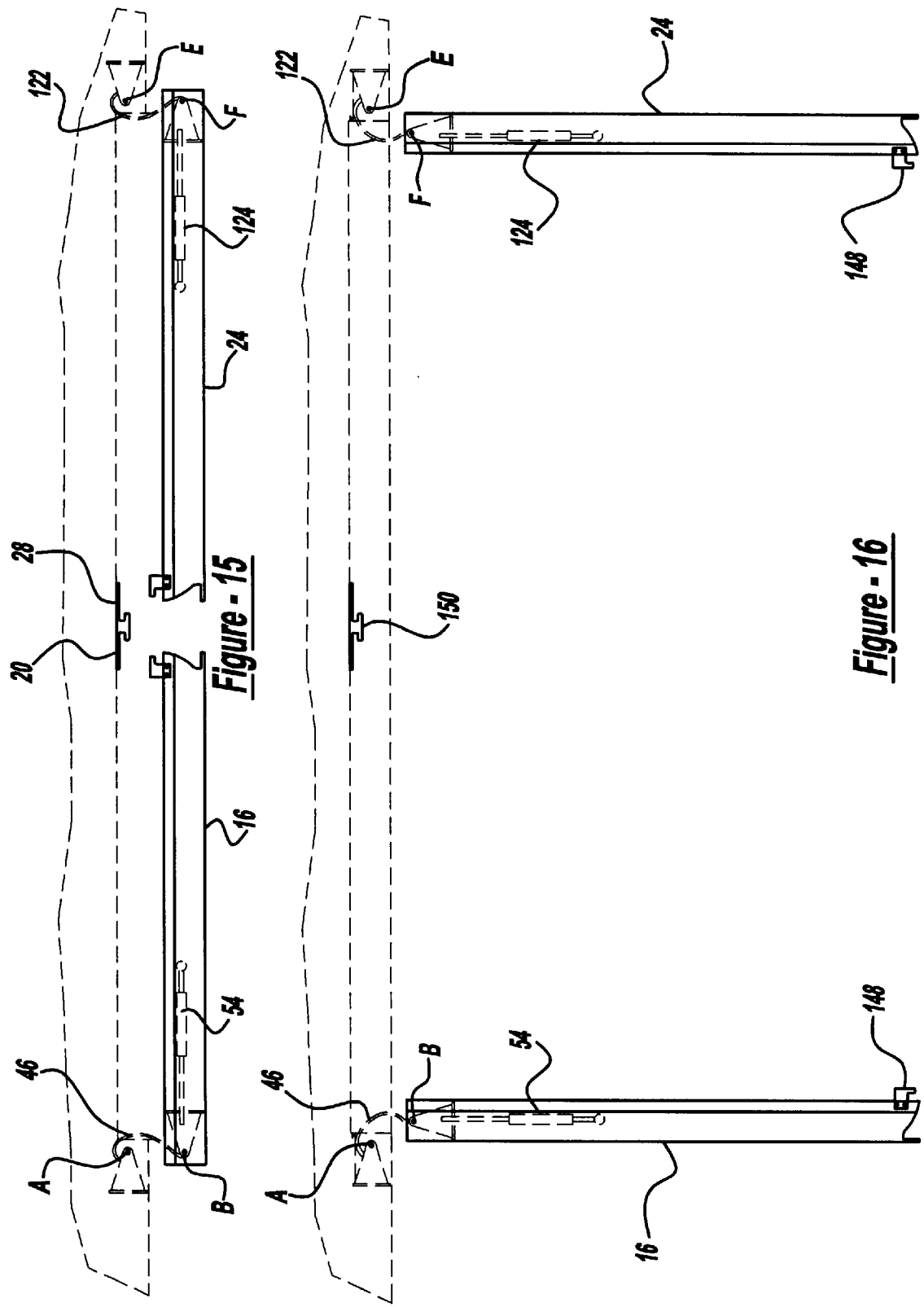

AUTOMOTIVE VEHICLE DOOR SYSTEM

BACKGROUND & SUMMARY OF THE INVENTION

The present invention relates to automotive vehicle door systems and, more particularly, relates to automotive vehicle door systems having a hinge defining a pair of pivot axes.

Typically, motor vehicle doors are pivotally coupled to a pillar of a motor vehicle using a hinge, wherein the hinge is rigidly mounted to the vehicle to support the leveraging forces of the vehicle door during articulation. A vertical pivot rod extends through the hinge and defines a single, vertical, pivot axis about which the door rotates during pivotal movement. To open the vehicle door, the door is pivoted about the single pivot axis. However, the pivotal movement of the vehicle door is limited by physical interference that is common between the leading edge of the vehicle door and the vehicle body panel. Thus, it should be appreciated that this conventional hinge may not maximize the opening to the passenger compartment, thereby hampering ingress and egress. Moreover, the use of this conventional hinge may lead to interference between body side moldings on the vehicle door and the forward body panel, if physical stops are not employed.

In some known four-door vehicles, these conventional door systems, which pivot about a single pivot axis, have been used such that the front doors swing in a first direction while the rear doors swing in an opposite direction. For purposes of this application, the term front-access rear doors will mean doors having a hinge on the rearward side of the door such that they open in a mirror direction relative to the front doors. When designing a single pivot door system to be used in this configuration, it is commonly necessary to make the doors thinner to eliminate physical interference between the locking edges of the front and rear doors. This thinning of the doors may not afford maximum packaging allowances for such mechanisms as power windows, door locks, and/or side impact protection.

Accordingly, there exists a need in the relevant art to provide an improved vehicle door system capable of maximizing the opening to the passenger compartment. Additionally, there exists a need in the relevant art to provide an improved vehicle door system capable of maintaining an acceptable vehicle door thickness for packaging of vehicle and safety components. Furthermore, there exists a need in the relevant art to provide an improved vehicle door system capable of eliminating a conventional vehicle B pillar (center pillar) and/or capable of receiving a power drive mechanism for driving the door.

In accordance with the broad teachings of the present invention, a vehicle door system having an advantageous construction and method of operation is provided which includes a door and a hinge having a first end pivotally connectable to the vehicle for rotation about a first pivot. In another aspect of the present invention, the hinge further includes a second end pivotally connected to the door for rotation about a second pivot. Yet another aspect of the present invention provides a first pivot hinge being parallel to and offset from a second hinge pivot.

According to alternative embodiments of the present invention, the door system may include a locking extension extending from the door and a receiver device mounted to the vehicle, whereby during a locking movement of the door, the locking extension slidably engages with the receiver device. In a further aspect of the present invention, this sliding engagement is generally parallel to a longitudinal axis of the vehicle (i.e. parallel to the plane of the door). An additional aspect of the present invention uses the door system that may include a biasing device for preventing rotation about the second pivot axis after a predetermined initial rotational movement. Another aspect of the present invention pertains to a pair of adjacent passenger doors that open in opposite directions.

Unlike known designs, the elimination of the vehicle B pillar (center pillar) extending between the doors may provide additional packaging and aesthetic benefits. Still further, it may be preferable to incorporate a power drive mechanism to facilitate automatic opening and closing of the vehicle doors.

Further areas of applicability of the present invention will become apparent from the detailed description provided hereinafter. It should be understood that the detailed description and specific examples, while indicating preferred embodiments of the invention, are intended for purposes of illustration only.

BRIEF DESCRIPTION OF THE DRAWINGS

The present invention will become more fully understood from the detailed description and the accompanying drawings, wherein:

FIG. 12 is a diagrammatic plan view of the automotive vehicle door system in a closed and locked position;

FIG. 13 is a diagrammatic plan view of the automotive vehicle door system illustrating a first opening motion;

FIG. 14 is a diagrammatic plan view of the automotive vehicle door system illustrating the sliding disengagement of the locking mechanism;

FIG. 15 is a diagrammatic plan view of the automotive vehicle door system following disengagement of the locking mechanism; and FIG. 16 is a diagrammatic plan view of the automotive vehicle door system in a fully opened and unlocked position.

DETAILED DESCRIPTION OF THE PREFERRED EMBODIMENT

The following description of the preferred embodiment is merely exemplary in nature and is in no way intended to limit the invention, its application, or uses. For example, the present invention may find utility in any door closure for a vehicle, including side doors, rear doors, and the like. In the following description of the preferred embodiment, the present invention will be described in connection with a rear-access front door and a front-access rear door, wherein each door is power actuated. It should be understood that the teaching of the present invention may be applied to applications others than the aforementioned.

Figure 1:
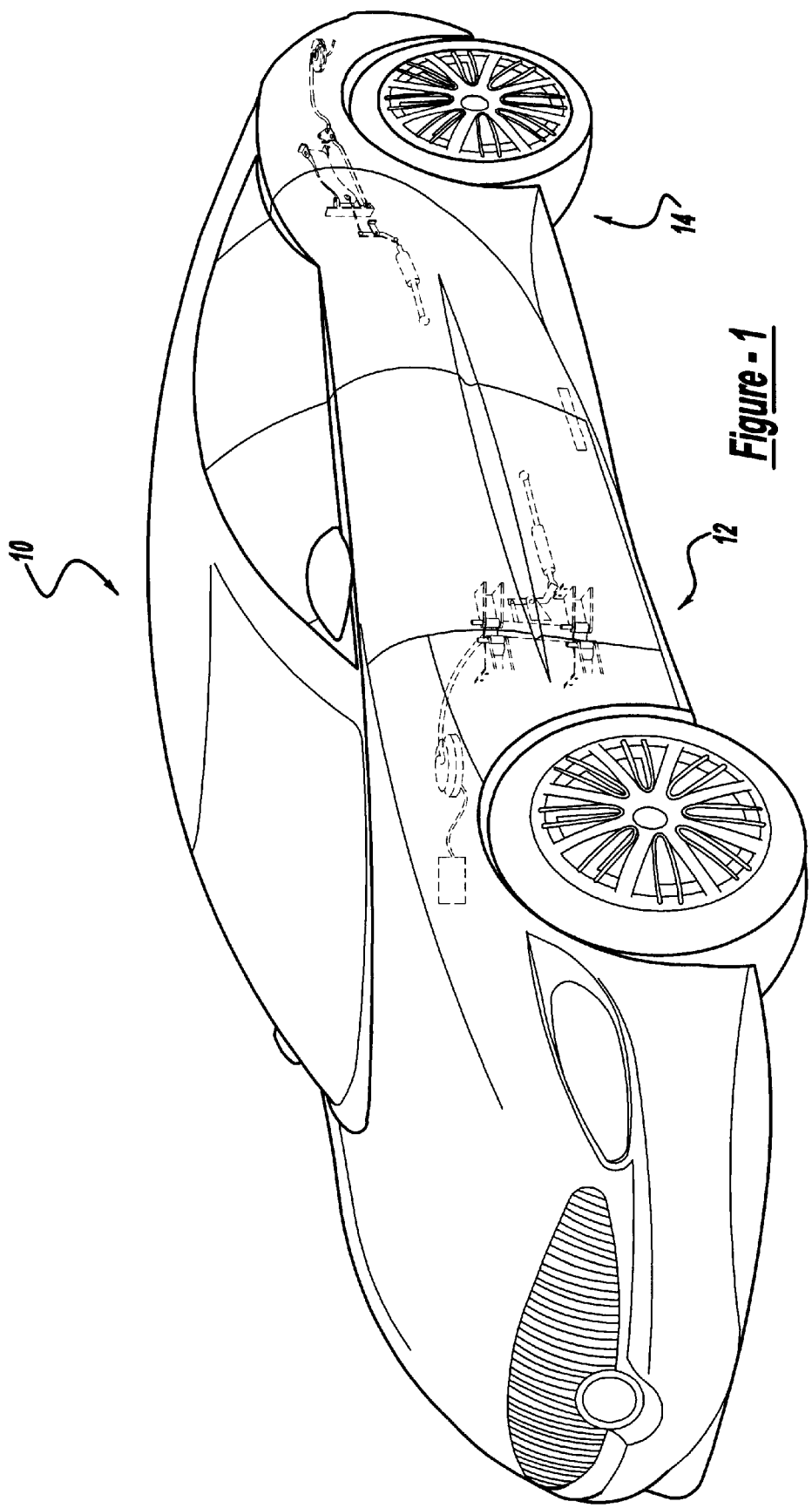
FIG. 1 is a perspective view of a vehicle employing the preferred automotive vehicle door system of the present invention.
Figure 2:
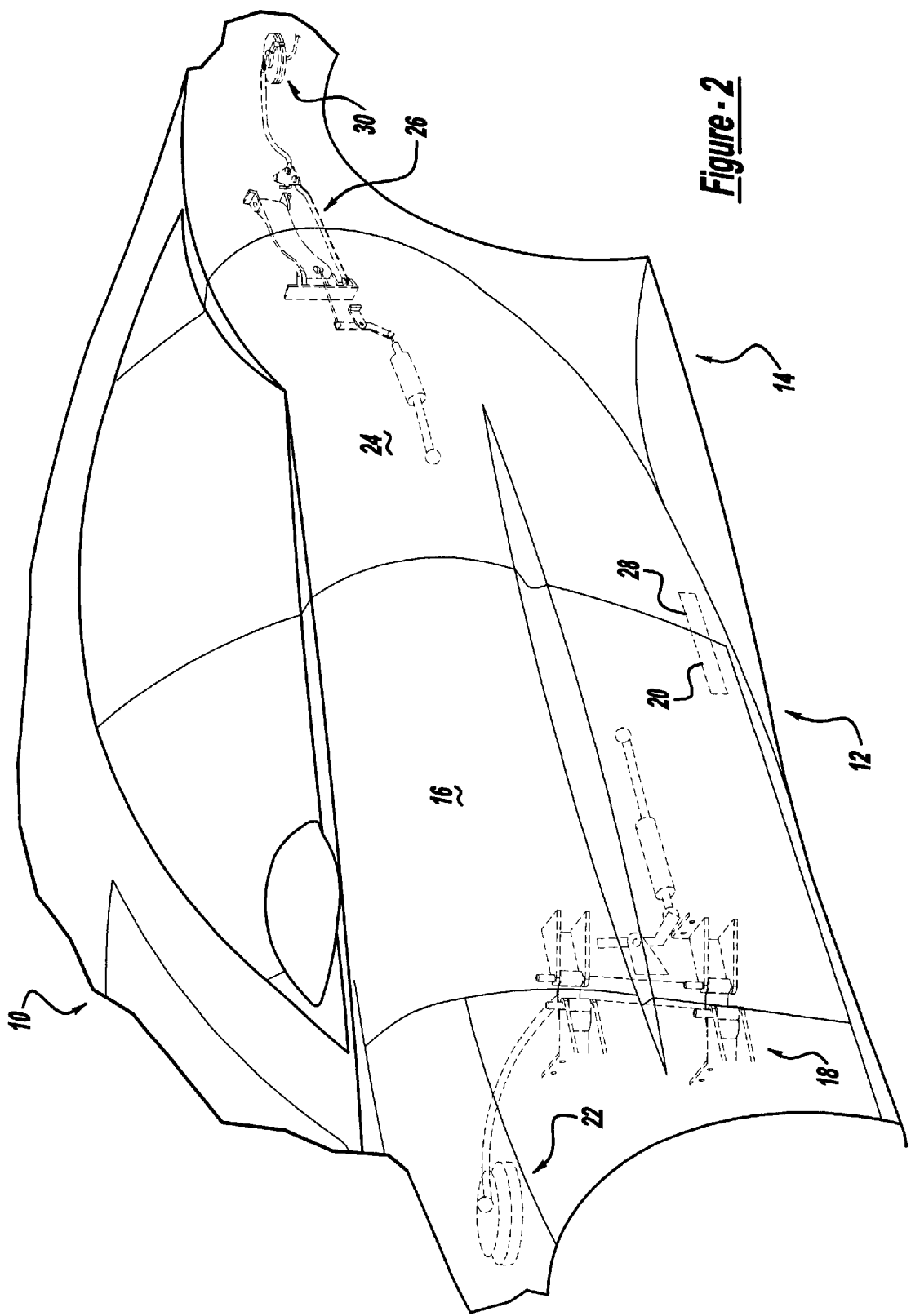
FIG. 2 is an enlarged perspective view of the automotive vehicle door system shown in FIG. 1.
Figure 3:
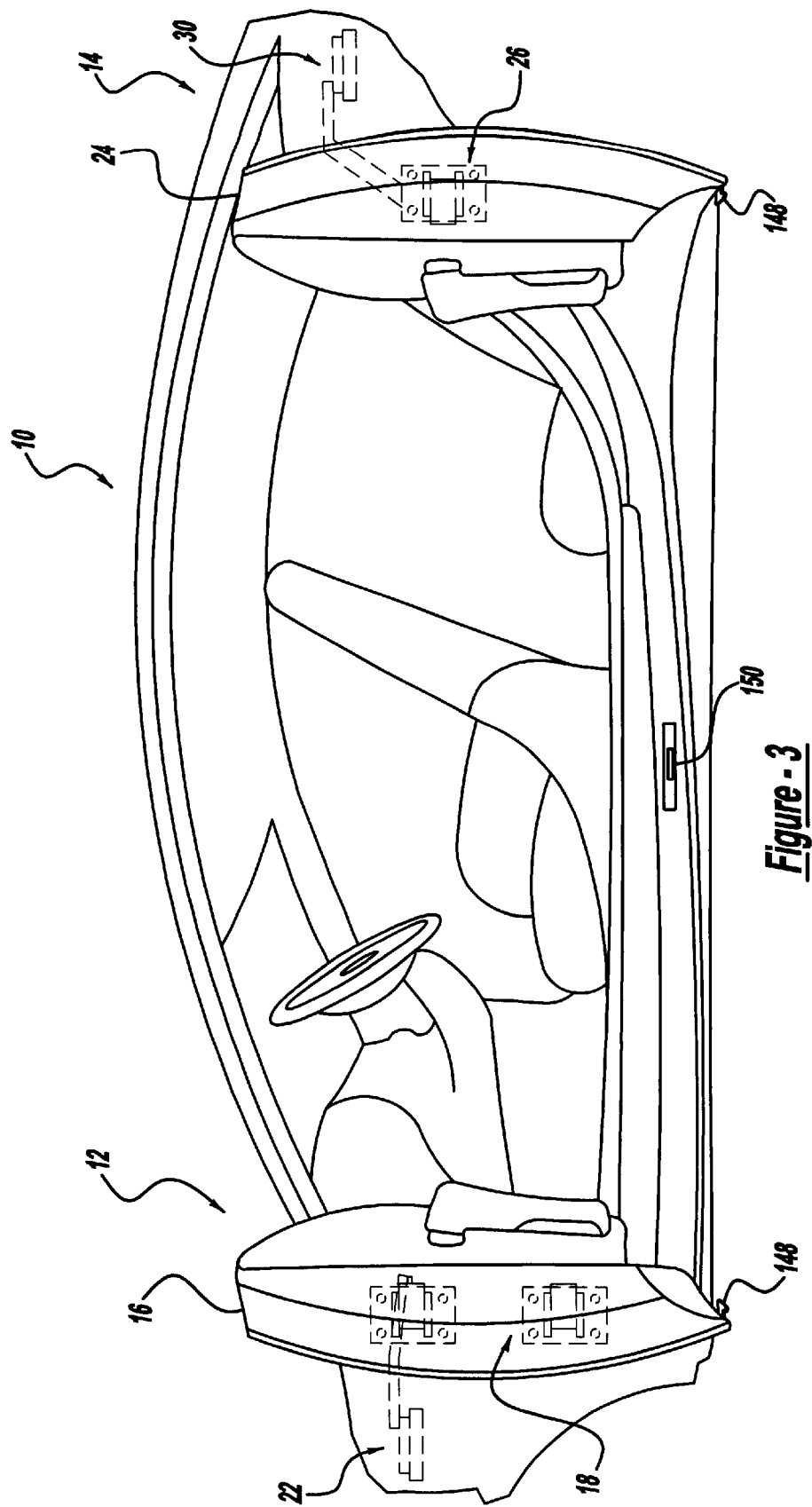
FIG. 3 is a side elevational view of the automotive vehicle door system in a substantially opened position.

Referring to FIGS. 1–3, the preferred embodiment of the automotive vehicle door system of the present invention is used in a vehicle 10 having a front door system 12 and a rear door system 14 mounted thereto. As will be described below, front door system 12 includes a front door 16, a front hinge unit 18, a locking device 20, and an automatic power-actuating device 22 (shown schematically). Similarly, rear door system 14 includes a rear door 24, a rear hinge unit 26, a locking device 28, and an automatic power-actuating device 30 (shown schematically). It should be understood that vehicle 10 further includes an additional front door system that is a mirror-image of front door system 12 and an additional rear door system that is a mirror-image of rear door system 14 disposed on the passenger's side of the vehicle. However, in the interest of brevity, only front door system 12 and rear door system 14 on the driver's left side (not in all countries) of the vehicle will be described in detail.

Figure 4:
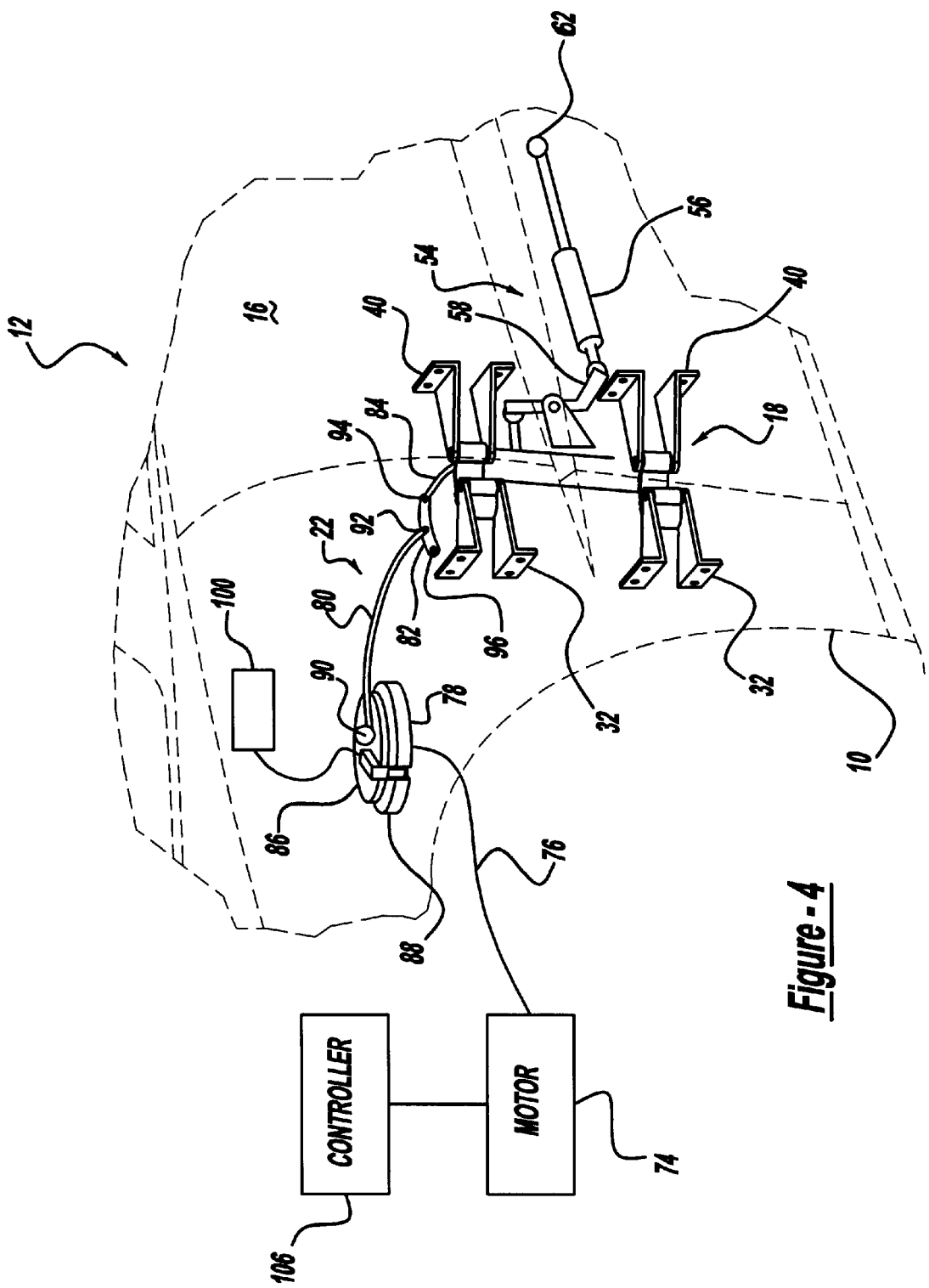
FIG. 4 is a perspective view, with portions represented schematically, of a front door system.
Figure 5:
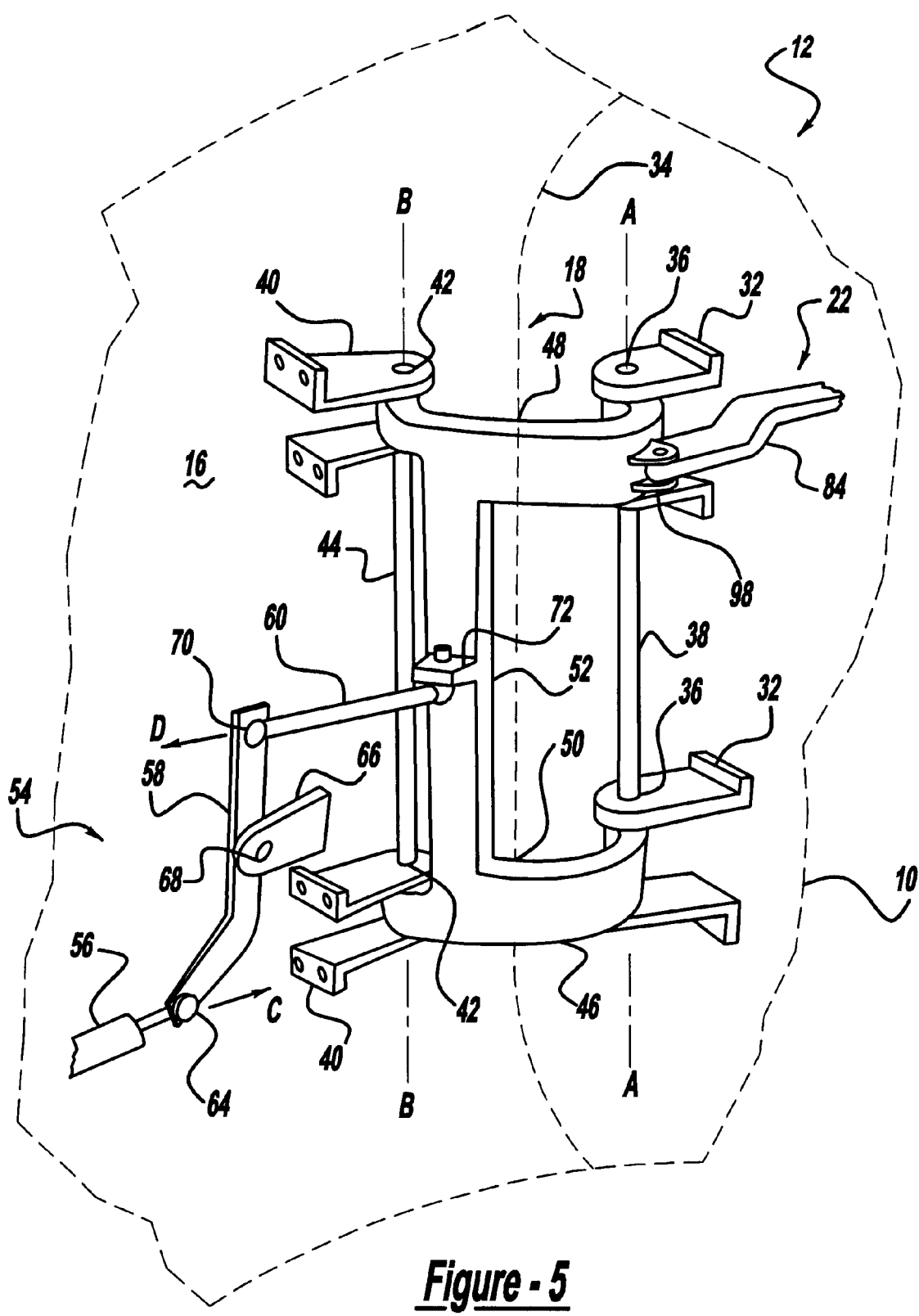
FIG. 5 is a perspective view of the front door system taken from an inboard position looking forward.

As best seen in FIGS. 4 and 5, front door system 12 includes front door 16, front hinge unit 18, and power-actuating device 22. Front hinge unit 18 includes a pair of vehicle mounting brackets 32 fixedly mounted to vehicle 10 within a door jamb section 34 of an A-pillar using threaded fasteners, welding, etc. Each of the pair of vehicle mounting brackets 32 includes apertures 36 (only two shown) for receiving a first generally vertically-disposed mounting rod 38. Similarly, front hinge unit 18 includes a pair of door mounting brackets 40 fixedly mounted to front door 16 within door jam section 34 using fasteners, welding, etc. Each of the pair of door mounting brackets 40 includes apertures 42 (only two shown) for receiving a second generally vertically-disposed mounting rod 44. Front hinge unit 18 still further includes a generally U-shaped main member 46 pivotally coupled at one end to vehicle mounting brackets 32 and at the other end to door mounting brackets 40. Specifically, U-shaped main member 46 includes an upper portion 48, a lower portion 50, and a vertically oriented portion 52 interconnecting upper portion 48 and lower portion 50. Apertures (not shown) are disposed at each end of upper portion 48 and lower portion 50 of U-shaped main member 46 for receiving first mounting rod 38 and second mounting rod 44. That Still referring to FIGS. 4 and 5, front hinge unit 18 further includes a pneumatic actuator assembly 54 generally disposed within front door 16. Pneumatic actuator assembly 54 includes a pneumatic actuator 56, a bell crank 58, and an interconnecting linkage 60. Pneumatic actuator 56 is of a piston and cylinder type. Pneumatic actuator 56 is disposed generally horizontally within front door 16 such that a first end of pneumatic actuator 56 is coupled to front door 16 at pivot 62 (FIG. 4) and a second end of pneumatic actuator 56 is coupled to bell crank 58 at pivot 64 (FIG. 5). It should be understood that pneumatic actuator 56 may be any actuator capable of providing a biasing force, such as a motor drive, rubber grommet, spring device, etc. Bell crank 58 is pivotally mounted within front door 16 to a bell crank bracket 66 such that bell crank 58 pivots about a central pivot 68. In the interest of packaging, bell crank 58 is preferably disposed in a generally vertical plane. However, in other figures bell crank 58 may be shown generally horizontally to aid in the description and understanding of the present disclosure.

As best seen in FIG. 5, bell crank 58 is further pivotally coupled to interconnecting linkage 60 at pivot 70. Lastly, interconnecting linkage 60 is pivotally coupled to vertically oriented portion 52 of U-shaped main member 46 at tab 72. Briefly, in operation, pneumatic actuator 56 exerts an outward force in the direction of arrow C, which causes bell crank 58 to pivot about central pivot 68 such that interconnecting linkage 60 is drawn in the direction of arrow D. This motion urges front door 16 towards U-shaped main member 46 to limit rotation of front door 16 about pivot axis B after a predetermined amount of rotation. This motion will be described further below. It should be appreciated that pneumatic actuator 56 and bell crank 58 may be oriented in any direction that is conducive to packaging so long as the door is urged or biased toward the main member. Moreover, as mentioned above, pneumatic actuator 56 may be any one of a number of actuating/biasing members and, thus, could exert only a compression force.

As best seen schematically in FIG. 4, power-actuating device 22 of front door system 12 includes an electric motor 74, a drive cable 76, a sector gear 78, a drive linkage 80, a bell crank 82, and a driven linkage 84. Electric motor 74 is preferably a compact DC motor commonly used in power-actuated vehicle systems. Electric motor 74 may be positioned at any location generally near sector gear 78, which is convenient for packaging purposes. Electric motor 74 is operably coupled to sector gear 78 through drive cable 76. Drive cable 76 may be any cable capable of transmitting a rotary driving motion therethrough, such as speedometer-type drive cables. Drive cable 76 is preferably laterally flexible to enable simple and convenient routing through vehicle 10. Drive cable 76 is operably coupled to sector gear 78 to transmit such rotary force. Sector gear 78 includes an upper plate member 86 and a lower plate member 88. Lower plate member 88 is rotatably driven by drive cable 76. Similarly, drive linkage 80 is pivotally coupled to upper plate member 86 at pivot 90. Upper plate member 86 and lower plate member 88 rotate together about a common axis such that rotational movement of drive cable 76 rotates lower plate member 88 and upper plate member 86. Such rotational movement of upper plate member 86 linearly drives drive linkage 80. Drive linkage 80 is pivotally coupled to bell crank 82 at pivot 92. Similarly, driven linkage 84 is pivotally coupled to bell crank 82 at pivot 94. As best seen in FIG. 4, bell crank 82 is pivotally mounted to vehicle 10 at pivot 96. Unlike bell crank 58, which pivots about central pivot 68 to produce an output that is generally in the opposite direction as the input, pivot 96 is positioned at an end of bell crank 82. Therefore, bell crank 82 produces an output that is generally in the same direction as the input; however, the output has a higher magnitude due to the amplifying effect of bell crank 82. Alternatively, bell crank 82 may be eliminated provided sufficient force is available to actuate the vehicle door.

As best seen in FIG. 5, driven linkage 84 is pivotally coupled to upper portion 48 of U-shaped main member 46 at tab 98. Briefly, in operation, motor 74 rotatably drives drive cable 76. Drive cable 76 transmits this rotational force to sector gear 78 and drive linkage 80. Drive linkage 80 linearly drives bell crank 82 about pivot 96, which linearly drives driven linkage 84, thereby rotating U-shaped main member 46 about pivot axis A.

Figure 6:
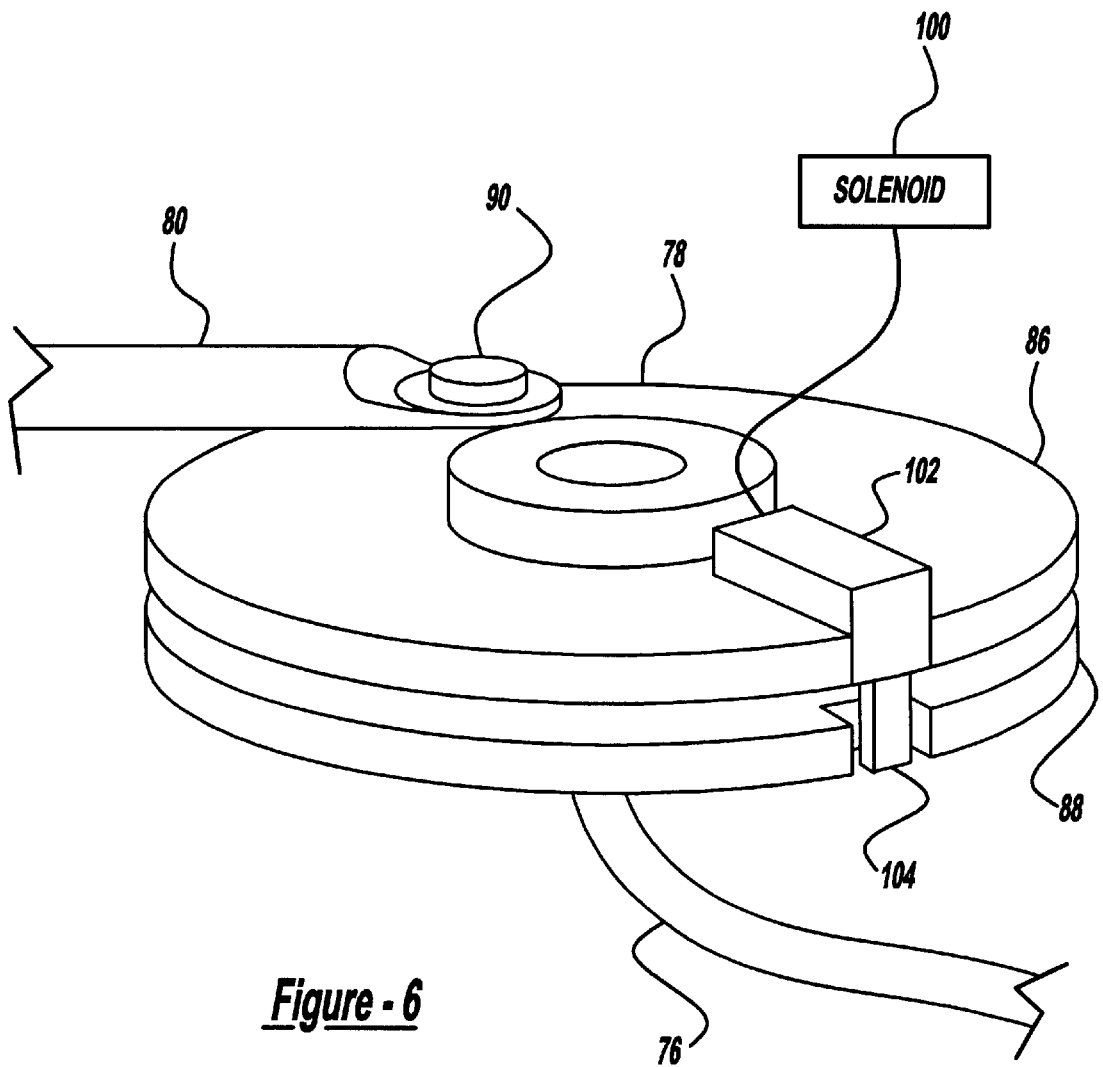
FIG. 6 is a perspective view of a sector gear assembly employed in the preferred embodiment automotive vehicle door system.

Referring to FIG. 6, sect or gear 78 further includes an electromagnetic solenoid 100, which selectively actuates a latch mechanism 102. Latch mechanism 102 includes a tab and notch 104 or other retaining means, such as gear teeth, etc. Latch mechanism 102 is shown mounted on upper plate member 86 of sector gear 78 and notch 104 is shown formed in lower plate member 88 of sector gear 78. Typically, the tab of latch mechanism 102 is retained within notch 104, thereby preventing relative motion between upper plate member 86 and lower plate member 88. This enables rotational input force from drive cable 76 to drive lower plate member 88 and upper plate member 86 simultaneously, thereby driving drive linkage 80. If a user prefers to open front door 16 manually, a controller 106 detects the depression of a door handle (not shown) through a switch that sends a signal to controller 106, controller 106 may then actuate solenoid 100 and, thus, release latch mechanism 102 from notch 104. Controller 106 is preferably a microprocessor capable of independently controlling front door system 12 and rear door system 14 in response to an input signal. The above arrangement enables upper plate member 86 and lower plate member 88 to rotate independently. It is anticipated that electronic controller 106, such as a microprocessor, may be programmed so as to enable manual opening, while having the ability to re-engage the latch mechanism with the notch to facilitate automatic closing. It is further anticipated that controller 106 will provide control for front power-actuating device 22 and rear power-actuating device 30.

Figure 7:
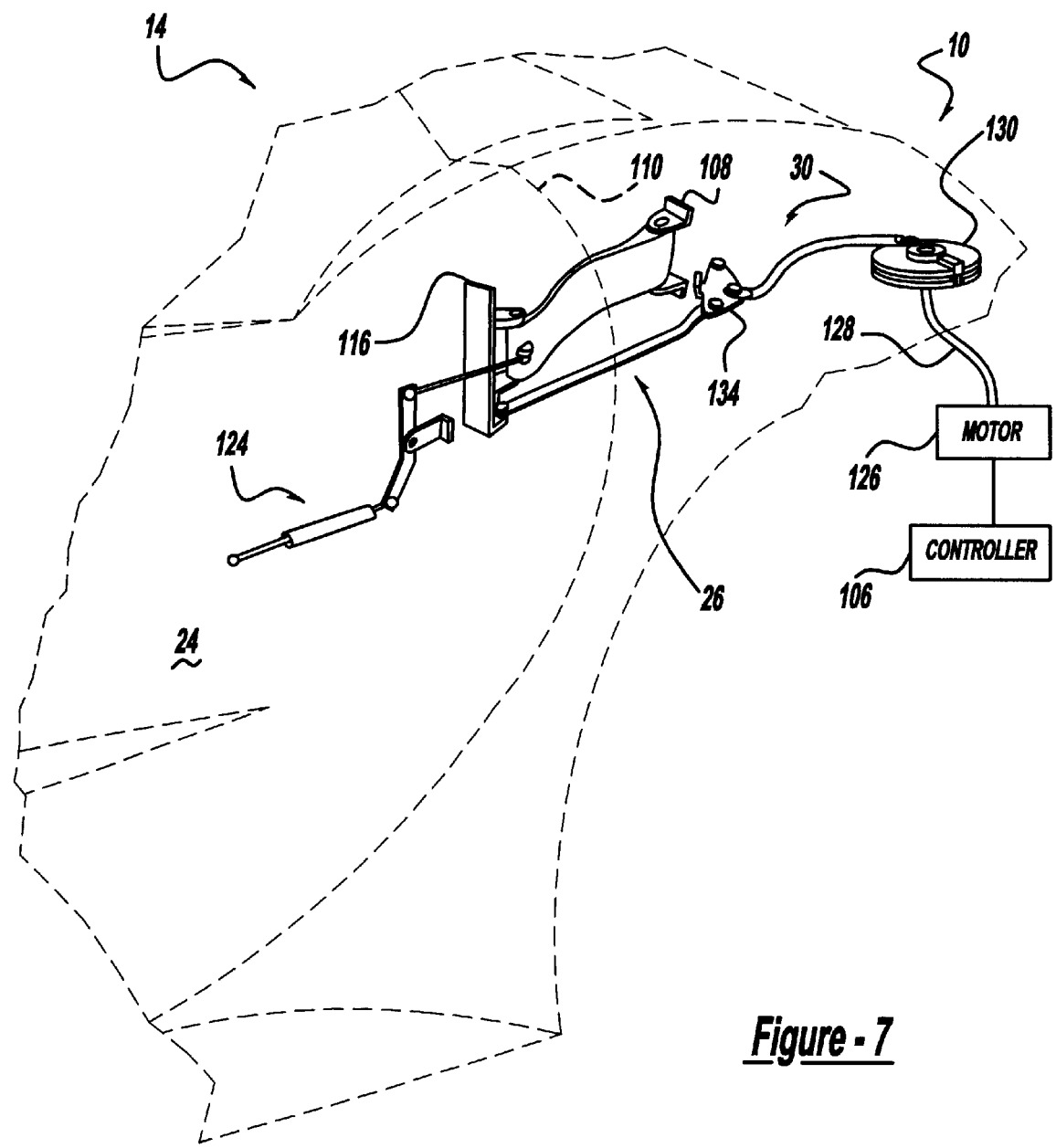
FIG. 7 is a perspective view, with portions represented schematically, of a rear door system.
Figure 8:
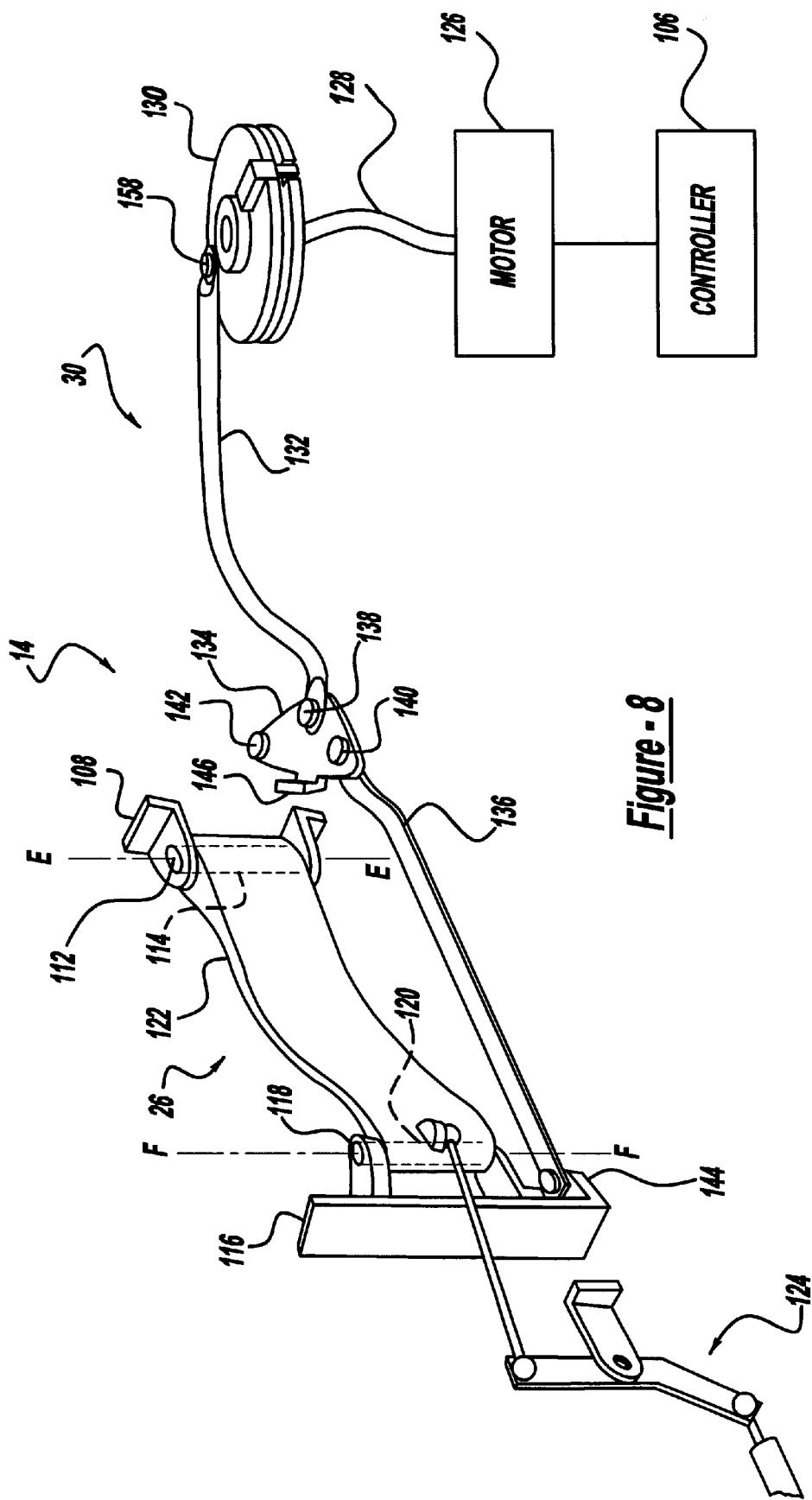
FIG. 8 is a perspective view of the rear door system taken from an outboard position looking rearward.

Turning now to FIGS. 7 and 8, rear door system 14 includes rear door 24, rear hinge unit 26, and power-actuating device 30. Rear hinge unit 26 includes a vehicle mounting bracket 108 fixedly mounted to vehicle 10 within a door jam section 110 of a C-pillar or quarter panel using conventional means, such as fasteners, welding, etc. Vehicle mounting bracket 108 includes apertures 112 (only one shown) for receiving a third generally vertically-disposed mounting rod 114. Similarly, rear hinge unit 26 includes a door mounting bracket 116 fixedly mounted to rear door 24 within door jam section 110 using conventional means, such as fasteners, welding, etc. Door mounting bracket 116 includes apertures 118 (only one shown) for receiving a fourth generally vertically-disposed mounting rod 120. Rear hinge unit 26 still further includes a generally elongated main member 122 pivotally coupled at one end to vehicle mounting bracket 108 and at the other end to door mounting bracket 116. Apertures (not shown) are disposed at each end of elongated main member 122 for receiving third mounting rod 114 and fourth mounting rod 120. That is, as best seen in FIG. 8, third mounting rod 114 extends through apertures 112 of vehicle mounting bracket 108 and the aperture formed at the end of elongated main member 122 to define a third vertically oriented pivot axis E. Similarly, fourth mounting rod 120 extends through apertures 118 of door mounting bracket 116 and the aperture formed at the other end of elongated main member 122 to define a fourth vertically oriented pivot axis F. As can be seen in FIG. 8, third pivot axis E is generally parallel to and offset from fourth pivot axis F.

Still referring to FIGS. 7 and 8, rear hinge unit 26 further includes a pneumatic actuator assembly 124 generally disposed within rear door 24. Pneumatic actuator assembly 124 is similarly configured as pneumatic actuator assembly 54.

Referring particularly to FIG. 8, power-actuating device 30 of rear door system 14 includes an electric motor 126, a drive cable 128, a sector gear 130, a drive linkage 132, a bell crank 134, and a driven linkage 136. Electric motor 126, drive cable 128, sector gear 130, drive linkage 132, and driven linkage 136 are similar to electric motor 74, drive cable 76, sector gear 78, drive linkage 80, and driven linkage 84. That is, drive linkage 132 is pivotally coupled to sector gear 130 at pivot 158.

As best seen in FIG. 8, bell crank 134 is pivotally mounted to vehicle 10 at pivot 142. Bell crank 134 is further pivotally coupled to drive linkage 132 at pivot 138 and pivotally coupled to driven linkage 136 at pivot 140. Unlike bell crank 58, which pivots about central pivot 68 to produce an output that is in the opposite direction as the input, pivot 142 is positioned at an end of bell crank 134. Therefore, bell crank 134 produces an output that is in the same direction as the input; however, the output has a higher magnitude due to the amplifying effect of bell crank 134. Unlike front door system 12 and as best seen in FIG. 8, driven linkage 136 is pivotally coupled to door mounting bracket 116 at tab 144. Moreover, unlike front door system 12, bell crank 134 further includes a protrusion 146. Upon rotation of bell crank 134 about pivot 142, driven linkage 136 drives door mounting bracket 116 and, thus, rear door 24. However, after a predetermined amount of rotation, protrusion 146 of bell crank 134 contacts elongated main member 122, thereby applying a driving force thereto. This contact between protrusion 146 of bell crank 134 and elongated main member 122 provides additional mechanical advantage to open rear door 24. The operation of the remaining components is generally the same as those described with respect to front door system 12.

Figure 9:
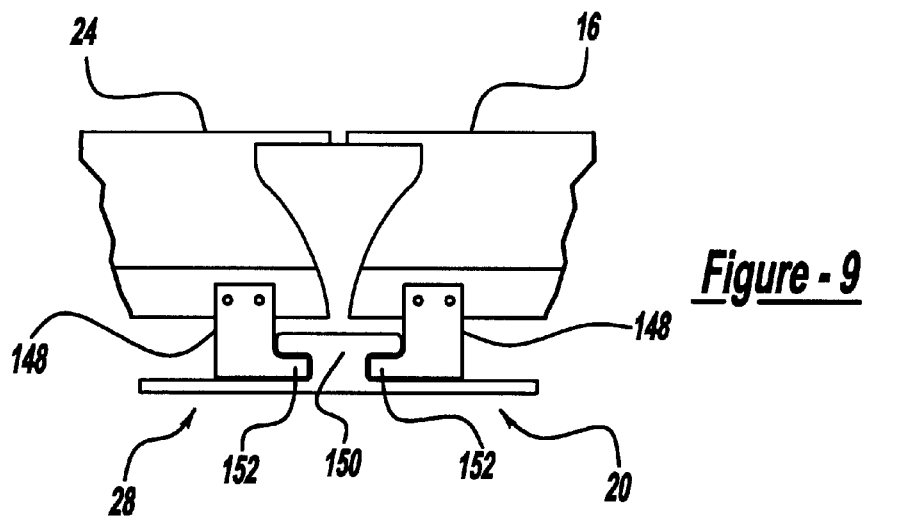
FIG. 9 is a diagrammatic plan view of a locking mechanism employed in the preferred embodiment automotive vehicle door system, disposed in a closed and locked position.
Figure 10:
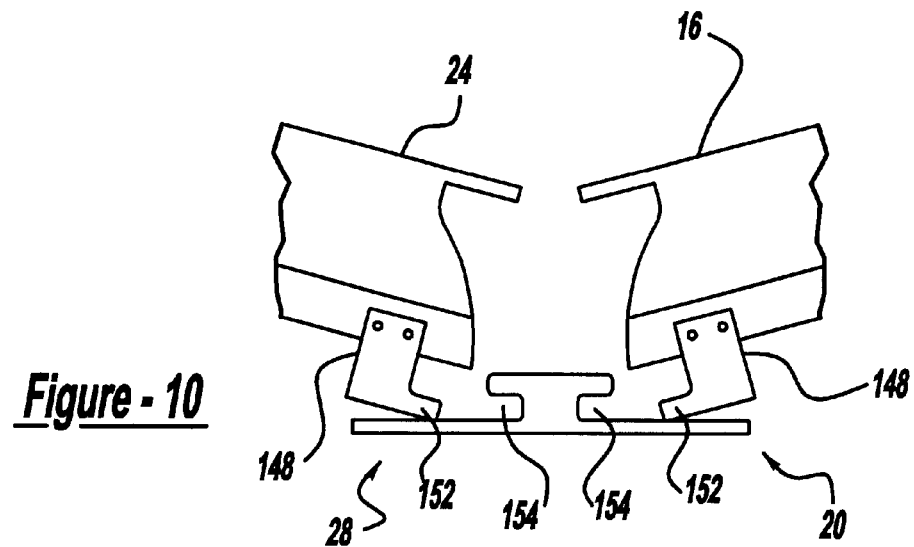
FIG. 10 is a diagrammatic plan view of the locking mechanism employed in the preferred embodiment automotive vehicle door system, disposed in a first intermediate position.
Figure 11:
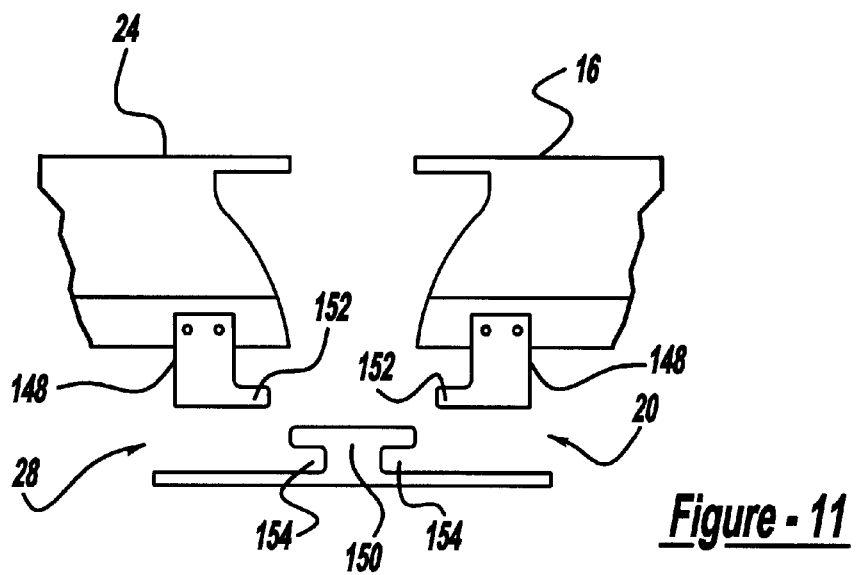
FIG. 11 is a diagrammatic plan view of the locking mechanism employed in the preferred embodiment automotive vehicle door system, disposed in a second intermediate position following disengagement of the locking mechanism.

Referring now to FIGS. 9–11, locking device 20 is shown having a bayonet 148 releasably disposed within a receiver 150. That is, front door 16 and rear door 24 each include a bayonet 148 mounted to a lower edge thereof via threaded fasteners, welding, etc. Each bayonet 148 includes a locking extension 152 which extends generally parallel to a longitudinal or fore-and-aft plane of each door 16, 24. Receiver 150 includes a pair of receiving channels 154 similarly extending generally parallel to a longitudinal axis of vehicle 10. Engagement between locking extension 152 of bayonet 148 and receiver 150 is achieved by a sliding motion in a direction generally parallel to the plane of the door. It should be noted that although receiver 150 is shown as a single unit, receiver 150 might be separated to provide two set apart receiver channels.

The operation of front door system 12 and rear door system 14 will now be described in detail with reference to FIGS. 12–16. FIGS. 12–16 sequentially illustrate the simultaneous opening motion of front door 16 and rear door 24. It should be appreciated, however, that front door 16 or rear door 24 may be opened or closed individually and are not required to be actuated in unison. However, in the interest of clarity of the disclosure, the opening motion of front door 16 and rear door 24 will be described together. It should also be noted that FIGS. 12–16 have portions of front hinge unit 18 and rear hinge unit 26 removed for additional clarity.

As best seen in FIG. 12, front door 16 and rear door 24 are shown in a fully closed and locked position. Upon actuation of front motor 74, front drive linkage 80 is driven as described above. Front motor 74 is energized by controller 106 such as an occupant operated electric door switch or a remote controller (a.k.a. a keyfob). Referring to FIGS. 5 and 13, as drive linkage 80 is driven outwardly against tab 98 of U-shaped main member 46, U-shaped main member 46 begins to rotate outwardly about axis A. This rotating motion of front door 16 about axis A causes an edge 156 of front door 16, adjacent front hinge unit 18, to first extend outward or "kick out." During this time, locking extension 152 of bayonet 148, which is mounted on the opposing edge of front door 16, remains within receiving channel 154 of receiver 150. This causes front door 16 to be generally angled inward from edge 156 to locking device 20.

Referring to FIG. 13, upon continued actuation of front motor 74, U-shaped main member 48 continues to rotate about pivot axis A. Simultaneously, front pneumatic actuator 56 begins to extend in the direction of arrow C due to the related motion of U-shaped main member 48 about pivot axis A. The extension of pneumatic actuator 56 against bell crank 58 causes bell crank 58 to pivot about central pivot 68, thereby pulling interconnecting linkage 60 in the direction of arrow D. The result of this motion is that front door 16 is drawn toward U-shaped main member 48 about pivot axis B. As best seen in FIGS. 13 and 14, as U-shaped main member 48 rotates about pivot axis A, front door 16 also rotates about pivot axis B, thereby sliding locking extension 152 generally parallel to plane of front door 16. Upon continued rotation about pivot axis A and pivot axis B, simultaneously, locking extension 152 is slid out of engagement with receiving channel 154, thereby unlocking locking device 20. Pneumatic actuator 56 will continue to draw or pull front door 16 toward U-shaped main member 48 until a physical stop (not shown) is reached, which prevents further relative motion therebetween. It should be noted, however, that until this physical stop is reached, an edge of locking extension 152 will generally remain in contact with vehicle 10 (see FIG. 14).

It is important to note that this initial "kick out" motion of edge 156 prior to rotation of front door 16 is advantageous in many respects. For example, this first "kick out" and rotation of the door provides much improved clearance between the door and the vehicle body panels. As noted in the background section, prior art methods are notorious for interference between the leading edge of the door and the body side panels. Thus, in convention methods, body side moldings were cut out or otherwise deformed to prevent such interference. Moreover, the gap spacing between the door and the body panel in conventional applications was larger to account for this potential for interference. In the present invention, this "kick out" motion overcomes these disadvantages in that the potential for interference is minimized and thus body side molding and gap spacing are improved. Moreover, this "kick out" motion occurs automatically in response to actuators 54, 124, and, thus, facilitate the automatic locking extension 152 is slid out of engagement with receiving channel 154. It should be understood that this sliding out motion, which is at least in part attributed to the "kick out" motion, enables a simple, yet strong locking mechanism to be used. This locking mechanism of the present invention does not require the typical locking mechanism, which includes various complicated latches, cables, and other components. features of the present invention. Still further, as a result of the "kick out" motion, Referring to FIGS. 15 and 16, front door 16 is shown in an intermediate opened position and a fully opened position, respectively. As seen in FIG. 15, still further actuation of front motor 74 continues to rotate U-shaped main member 46 about axis A, while no relative motion is experienced about axis B between front door 16 and U-shaped main member 46. Front door 16 will continue to rotate about axis A until front door is in a fully opened position (FIG. 16). To close front door 16, an opposite drive motion occurs wherein front door 16 rotates about axis A until locking extension 152 contacts vehicle 10 and begins to slid within receiving channel 154. This sliding motion is accompanied by the closing force overcoming the biasing force of pneumatic actuator 56 to cause pneumatic actuator 56 to compress.

Generally, the above described steps of opening and closing front door 16 apply to the opening and closing of rear door 24. However, driven linkage 136 (FIG. 8) is coupled directly to door mounting bracket 116, rather than to the main member (i.e. U-shaped main member or elongated main member). Therefore, the opening forces produced by rear motor 126 are applied directly to rear door 24 through door mounting bracket 116. This arrangement provides the additional mechanical advantage necessary to actuate the front-access rear door 24. However, it should also be noted that after a predetermined amount of rotation, protrusion 146 of bell crank 134 contacts elongated main member 122 such that force is then applied directly to elongated main member 122 at the contact point. This again allows improved mechanical advantages necessary to actuate the front-access rear door 24.

During manual opening of front door 16 or rear door 24, it is preferable to bypass sector gears 78 and 146, respectively, upon detection of a user actuating the door handle. This would enable the pneumatic actuators (i.e. 56) to "pop" or "kick" the edge of the door outward, thereby unlocking the door from the respective locking device and enabling the user to manually open or close the door. More particularly, when sector gears 78 and 146 are bypassed, upper plate member 86 is free to rotate independently from lower plate member 88. As one will recall, when upper plate member 86 is interlocked with lower plate member 88, sector gear 78 overcomes the biasing force of actuator 54. When upper plate 86 is unlatched from lower plate member 88, the biasing force of actuator 54 is free to act upon front door 16. The force exerted, as described above, will act in the direction of arrow D (FIG. 5), thereby drawing front door 16 toward hinge unit 18 about axis B. This motion acts to "kick" edge 156 outward and unlock locking device 20, thereby enabling manual articulation of front door 16.

As been seen in FIGS. 3 and 16, the vehicle door system of the present invention provides an enlarged opening for ingress and egress from the vehicle relative to conventional arrangements. By way of a non-limiting example, the vehicle door system of the present invention enables the front door and rear door to each be opened at least 70° and, more preferably, to open approximately 90°. However, it should also be understood that the front door and rear door may be opened approximately 180° should it be desired to "fold" the doors generally adjacent the forward and rearward body panels. According to an alternative embodiment of the present invention, if the vehicle door system is used as a rear door(s) on a van, the door(s) could open more than 180° (e.g. 270°) to again fold generally adjacent the side body panels of the van. Therefore, the doors would be rotated out of the way to permit an unobstructed walking path around the vehicle. Particularly in FIG. 3, one can appreciate that the ease of use and aesthetic benefits of such enlarged openings of the present invention, which could not be attained using conventional single pivot hinge mechanisms, are afforded by the present invention. This is especially desirable for elderly, handicapped, or larger occupants. Moreover, one can appreciate the aesthetic benefits to having a single, continuous opening allowing access to the cabin of the vehicle.

While the preferred embodiment has been disclosed herein, it should appreciated that other variations may be employed within scope of the present invention. For example, the electric motors and driving links can be placed inside the doors. Furthermore, cables or gears may be substituted for several of the disclosed linkages. Hydraulic actuation can also be employed, although with some assembly and modularity disadvantages. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door system for an automotive vehicle having a vehicle body, the door system comprising:
    a door having an outer surface, the outer surface defining a plane;
    a hinge coupling the door to the vehicle body, the hinge having a first axis and a second axis;
    a first locking component extending from the door;
    a second locking component mountable to the vehicle body, the second locking component being lockingly engageable with the first locking component during a locking movement of the door, the door pivoting about the first axis and the second axis thereby slidably engaging the first locking component with the second locking component, the siding of the first locking component being substantially parallel to the plane of the door; and
    an actuator assembly coupling the door and the hinge, the actuator assembly operably urging the door toward the hinge about the second axis.

2. The door system according to claim 1, further comprising a power-actuating device coupled to at least one of the hinge and the door for automatically driving the door between a first position and a second position.

3. The door system according to claim 2 wherein the power-actuating device includes:
    a driven gearset;
    a linkage pivotally coupling the driven gearset and one of the hinge and the door;
    a motor operably driving the driven gearset; and
    a controller coupled to the motor for selectively engaging the motor.

4. The door system according to claim 3, further comprising a cable drive interconnecting the motor and the driven gearset to operably transmit rotational power to the driven gearset.

5. The door system according to claim 3 wherein the driven gearset is a clutching sector gear and the clutching sector gear has a releasable latch to enable free articulation of the door.

6. The door system according to claim 2 wherein the power-actuating device further comprises:
    a bell crank;
    a first linkage pivotally coupling the bell crank and the hinge;
    a driven gearset;
    a second linkage pivotally coupling the crank and the driven gearset;
    a motor operably driving the driven gearset; and
    a controller coupled to the motor for selectively engaging the motor.

7. The door system according to claim 6 wherein the driven gearset is a clutching sector gear and the clutching sector gear has a releasable latch to enable free articulation of the door.

8. The door system according to claim 1 wherein the door is a front-access rear door.

9. The system according to claim 1 wherein the first locking component is a bayonet and the second locking component is a receiver for receiving the bayonet.

10. A door system for a vehicle, the door system comprising:
    a door;
    a link pivotally connected to the vehicle for pivotal movement about a first axis and to the door for pivotal movement about a second axis; and
    an actuator coupling the door and the link, the actuator operably urging the door toward the link about the second axis.

11. The door system according to claim 10, further comprising a power-actuating device coupled to one of the link and the door operably driving the door between a first position and a second position.

12. The door system according to claim 11 wherein the power-actuating device includes:
    a driven gearset;
    a linkage pivotally coupling the driven gearset and one of the link and the door;
    a motor operably driving the driven gearset; and
    a controller coupled to the motor for selectively engaging the motor.

13. The door system according to claim 12, further comprising a cable drive interconnecting the motor and the driven gearset to operably transmit rotational power to the driven gearset.

14. The door system according to claim 12 wherein the driven gearset is a clutching sector gear and the clutching sector gear has a releasable latch to enable free articulation of the door.

15. The door system according to claim 11 wherein the power-actuating device further comprises:
    a bell crank;
    a first linkage pivotally coupling the bell crank and one of the link and the door;
    a driven gearset;
    a second linkage pivotally coupling between the bell crank and the driven gearset;
    a motor operably driving the driven gearset; and
    a controller coupled to the motor for selectively engaging the motor.

16. The door system according to claim 15 wherein the driven gearset is a clutching sector gear and the clutching sector gear has a releasable latch to enable manual rotation of the door.

17. The door system according to claim 10, further comprising:
    a locking extension extending from the door; and
    a receiver mountable to the vehicle,
    during a locking movement of the door, the door pivots about the first axis and the second axis simultaneously, thereby slidably engaging the locking extension with the receiver device, the sliding of the locking extension being substantially parallel to a plane of the door.

18. The door system according to claim 10 wherein the door is a front-access rear door.

19. An automotive vehicle comprising:

a body structure;

a door having an outer surface, the outer surface defining a plane;

a hinge pivotally connected to the body structure for pivotal movement about a first axis and to the door for pivotal movement about a second axis;

an actuator assembly coupling the door and the hinge, the actuator assembly urging the door toward the hinge about the second axis;

a power-actuating device coupled to at least one of the hinge and the door operably driving the door between a first position and a second position;

a first locking component extending generally from the second opposing end of the door; and a second locking component mounted to the body structure, during a locking movement of the door, the door simultaneously pivoting about the first axis and the second axis, thereby slidably engaging the first locking component with the second locking component, the sliding of the first locking component being substantially parallel to the plane of the door.

20. The automotive vehicle according to claim 19 wherein the power-actuating device includes:

a driven gearset;

a connecting device pivotally coupling the driven gearset and at least one of the hinge and the door;

a motor operably driving the driven gearset; and a controller coupled to the motor for selectively engaging the motor.

21. The automotive vehicle according to claim 20 wherein the connecting device comprises:

a bell crank;

a first linkage pivotally coupling the bell crank and at least one of the hinge and the door; and a second linkage pivotally coupling the bell crank and the driven gearset.

22. The automotive vehicle according to claim 20, further comprising a cable drive interconnecting the motor and the driven gearset to operably transmit rotational power to the driven gearset.

23. The automotive vehicle according to claim 20 wherein the driven gearset is a clutching sector gear and the clutching sector gear has a releasable latch to enable manual rotation of the door.

24. The automotive vehicle according to claim 19 wherein the first locking component is a bayonet and the second locking component is a receiver for receiving the bayonet.

25. An automotive vehicle comprising:

a body structure defining first and second openings, the first and second openings being adjacent each other and generally defining a plane;

a first door pivotably coupled to the body structure for covering the first opening, the first door being pivotable in a first direction;

a second door pivotably coupled to the body structure for covering the second opening, the second door being pivotable in a second direction, the second direction being opposite of the first direction;

a first locking component mounted to the body structure; and a second locking component extending from at least one of the first door and the second door, the second locking component slidably engaging the first locking component, the sliding of the second locking component being substantially parallel to the plane.

26. The automotive vehicle according to claim 25 further comprising:

a third locking component being mounted to the body structure; and a fourth locking component extending from the other of the first door and the second door, the fourth locking component slidably engaging the third locking component, the sliding of the fourth locking component being substantially parallel to the plane.

27. The automotive vehicle according to claim 26 wherein the first locking component and the third locking component are integrally formed as a single component.

28. The automotive vehicle according to claim 25 wherein the first opening and the second opening together define a single continuous opening.

29. The automotive vehicle according to claim 25 wherein the first locking component is a receiver and the second locking component is a bayonet for sliding engagement with the receiver.

30. The automotive vehicle according to claim 26 wherein the third locking component is a receiver and the fourth locking component is a bayonet for sliding engagement with the receiver.

31. A method of operating a door in a motor vehicle, the door having a hinging section and an opposing section, the door being positionable between a locked position and an opened position, comprising:

(a) unlocking the door from the motor vehicle;

(b) moving the hinging section of the door outward relative to the opposing section of the door; and (c) pivoting the opposing section of the door about the hinging section to the opened position after step (b).

32. The method according to claim 31 wherein the moving the hinging section of the door outward relative to the opposing section of the door includes pivoting the door about a first pivot axis and a second pivot axis simultaneously.

33. The method according to claim 32 wherein the pivoting the opposing section of the door about the hinging section to the opened position includes pivoting the door about the first pivot axis only.

34. The method according to claim 31 wherein the door pivots at least about 70 degrees relative to the closed position.

35. A method of opening a door in a vehicle having a lock, comprising:

(a) moving the door outwardly from the vehicle and longitudinally away from the lock to unlock the door; and (b) thereafter pivoting the door to an opened position.

36. The method according to claim 35 wherein the moving the door outwardly from the vehicle and longitudinally away from the lock to unlock the door includes pivoting the door about a first axis and a second axis simultaneously.

37. The method according to claim 35 wherein the thereafter pivoting the door to an opened position includes pivoting the door about the first axis only.

38. The method according to claim 35 wherein the door pivots at least about 70 degrees relative to the closed position.

* * * * *

UNITED STATES PATENT AND TRADEMARK OFFICE
CERTIFICATE OF CORRECTION

PATENT NO. : 6,305,737 B1
DATED : October 23, 2001
INVENTOR(S) : George A. Corder et al.

It is certified that error appears in the above-identified patent and that said Letters Patent is hereby corrected as shown below:

Column 3,
Line 16, "others" should be -- other --.
Line 46, "jam" should be -- jamb --.
Line 59, after "That" insert -- is, as best seen in FIG. 5, first mounting rod 38 extends through apertures 36 of vehicle mounting brackets 32 and the apertures formed at the end of upper portion 48 and lower portion 50 of U-shaped main member 46 to define a first vertically oriented axis A. Similarly, second mounting rod 44 extends through apertures 42 of door mounting brackets 40 and the apertures formed at the other end of upper portion 48 and lower portion 50 of U-shaped main member to define a second vertically oriented axis B. As can be seen in FIG. 5, first axis A is generally parallel to and offset from second axis B. --.

Column 5,
Line 7, "sect or" should be -- sector --.
Lines 40 and 46, "jam" should be -- jamb --.

Column 7,
Line 43, "convention" should be -- conventional --.
Line 53, after "automatic" insert -- features of the present invention. Still further, as a result of the "kick out" motion, --.
Lines 60-62, after "components.", delete "features of the present invention. Still further, as a result of the "kick out" motion,".

Column 8,
Line 6, "slid" should be -- slide --.

Column 9,
Line 6, after first occurrence of "the" insert -- bell --.
Line 29, "siding" should be -- sliding --.

Column 10,
Line 64, after "receiver" delete "device".

UNITED STATES PATENT AND TRADEMARK OFFICE
CERTIFICATE OF CORRECTION

PATENT NO.    : 6,305,737 B1
DATED         : October 23, 2001
INVENTOR(S)   : George A. Corder et al.

It is certified that error appears in the above-identified patent and that said Letters Patent is hereby corrected as shown below:

Column 12,
Lines 38-39, after "moving" insert -- of --.
Lines 43-44, after "pivoting" insert -- of --.
Lines 56-57, after "moving" insert -- of --.
Line 60, after "wherein" delete "the".

Signed and Sealed this

Seventh Day of October, 2003

JAMES E. ROGAN
*Director of the United States Patent and Trademark Office*